United States Patent
Bezera et al.

(10) Patent No.: US 6,862,690 B1
(45) Date of Patent: Mar. 1, 2005

(54) HIERARCHICAL RECOVERY METHOD FOR FIBRE-CHANNEL DEVICES

(75) Inventors: Michael W. Bezera, Raleigh, NC (US); Eric R. Vook, Durham, NC (US); Michael Burriss, Raleigh, NC (US); Helga Sonner, Durham, NC (US); Derek Scott, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 645 days.

(21) Appl. No.: 09/882,707

(22) Filed: Jun. 15, 2001

(51) Int. Cl.[7] ............................................... G06F 11/00
(52) U.S. Cl. ............................................ 714/4; 714/43
(58) Field of Search ................................ 714/43, 4, 55, 714/56

(56) References Cited

U.S. PATENT DOCUMENTS

| | | | | |
|---|---|---|---|---|
| 4,380,067 A | * | 4/1983 | Beardsley et al. ............. | 714/4 |
| 4,701,756 A | * | 10/1987 | Burr ....................... | 340/825.02 |
| 5,404,503 A | | 4/1995 | Hill et al. | |
| 5,933,590 A | * | 8/1999 | Allen ............................ | 714/4 |
| 6,532,552 B1 | | 3/2003 | Benignus et al. | |
| 6,597,658 B1 | * | 7/2003 | Simmons ..................... | 370/221 |
| 6,643,693 B1 | * | 11/2003 | Reynolds et al. ........... | 709/223 |
| 6,662,308 B1 | * | 12/2003 | Baroni et al. .................. | 714/4 |
| 6,708,297 B1 | | 3/2004 | Bassel | |
| 2001/0052084 A1 | * | 12/2001 | Huang et al. .................. | 714/4 |

* cited by examiner

Primary Examiner—Scott Baderman
(74) Attorney, Agent, or Firm—A. Jose Cortina; Daniels Daniels & Verdonik, P.A.; R. Kevin Perkins

(57) ABSTRACT

A method and system for recovering nodes in a hierarchical computer network is disclosed. The operating system of the network detects and exception condition, recovers only the nodes within the scope of the exception condition, and issues I/O requests to nodes during recovery that are not within the scope of the exception condition. The method may involve a computer network system with a plurality of paths connected to adapters on at least one host computer for managing input/output (I/O) requests between the host computer and fibre channel devices, which have a plurality of logical units (LUNs) associated therewith.

20 Claims, 13 Drawing Sheets

HIERARCHICAL RECOVERY METHOD FOR FIBRE-CHANNEL DEVICES

BACKGROUND OF THE INVENTION

1. Field of the Invention

This invention relates to a method and system for recovering devices on a computer network. More specifically, the invention provides such a method and system for an array of devices and processors having a hierarchical structure, such as non-uniform memory access ("NUMA") class servers.

2. Background of the Invention

Computer processors and devices may be linked together through a computer network. By "device" is meant any device that adds capacity to the network, such as a disk storage device, any array of disk drives, or similar devices. Data is transferred between the processors and devices through an input/output ("I/O") request. An I/O request is any software operation that transfers data to or from a processor or device.

In a computer network, the processors and devices are all identified to the network by a unique identifier or address. Unique identifiers or addresses are also used to define and identify divisions within the devices and processors such as memory locations, files, application programs, and users. A path is a route to or between address points or nodes within the organized network structure. By the term "node" is meant a connection point for data transmissions. A node may be a redistribution point or an end point for data transmissions. A node is generally programmed or engineered to recognize and process or forward transmissions to other nodes.

When the network connections are established, an operating system is loaded onto the processor or processors such that applications and devices may be run and controlled from the operating system. The operating system identifies the address of all devices, processors, and applications in the network. Devices, processors, and applications are all examples of nodes in the network. A system administrator may manually identify all nodes in the network, or alternatively, the operating system may issue standard commands to determine which nodes are available on the network.

As I/O requests are issued and processed between nodes, exception conditions can occur. By "exception" is meant a condition that causes a program or processor to branch to a different routine. Exception conditions are typically error conditions and can refer to either hardware or software conditions. An example of an exception condition is where a device issues an I/O request and never receives a response. After a given amount of time, the I/O request will "time out," leading to the presumption that the I/O request was not processed. There are several possible reasons for this type of exception condition. The physical cable connection between the device and the processor or device to which the I/O request was directed might be severed, or the processor or device might be unable to process the number of I/O request being issued.

When an exception condition occurs, the network performs a recovery or revalidation operation. By the terms "recovery" or "revalidation" is meant an operation re-establishing the path to a node such that the node is properly identified to the system and I/O requests may be processed. As would be understood by one of ordinary skill in the art, recovery is generally performed through a standard series of software commands. One common standard for recovery commands is specified by the American National Standards Institute ("ANSI").

Typically, when an exception condition occurs, every node on the computer network is recovered. Furthermore, I/O functions are suspended during the recovery operations. In relatively small computer networks, recovering every node does not normally significantly affect the network function. However, as computer networks become more complex and larger in size, recovering every node on the network becomes prohibitively time consuming and has a significant effect on network function and efficiency.

Thus, in accordance with the method and system described herein, the prior art problems including inefficient, massive recovery of network devices, processors, and other nodes, and other problems are avoided, and numerous advantages are provided.

BRIEF SUMMARY OF THE INVENTION

In one aspect, the invention is directed to a method of selectively recovering nodes on a computer network. The network detects an exception condition and recovers only the nodes within the scope of the exception condition. By "scope of the exception condition" is meant any node that is affected by the exception condition such that input/output ("I/O") requests are not processed. The network issues I/O requests to nodes during recovery that are not within the scope of the exception condition.

In another aspect, the computer network has a hierarchical structure, and the recovery operations are processed sequentially starting from the top of the hierarchy. More preferably, the network detects if a node is in an unrecoverable state. By "unrecoverable state" is meant that the node is probably not recoverable through software commands. Indications that the node is not recoverable include a number of unsuccessful recovery attempts. If the node is in an unrecoverable state, the network aborts recovery on the node and all nodes beneath the unrecoverable node in the hierarchical structure.

Yet still further, if recovery of a node is unsuccessful, the computer network retries the recovery. If the recovery has been retried a number of times, the network marks the node as unrecoverable. By the term "marking" is meant that the network sets the node state to an unrecoverable state. In addition, the network sets the node state to an unrecoverable state if recovery is not successful for any reason indicating recovery is not possible with software commands, for example, an error in the identification of the node.

In a more specific aspect, the invention is directed to a method of selectively recovering nodes on a computer network that has a plurality of paths connected to adapters on at least one host computer and fibre channel devices (FIDs) with a plurality of logical units (LUNs or "units") associated therewith. The network detects an exception condition and recovers only the adapters, FIDs, and LUNs within the scope of the exception condition. The network continues to issue I/O requests to adapters, FIDs and LUNs that are not within the scope of the exception condition.

In a more specific aspect, if the adapter needs to be recovered, the adapter is recovered before recovering the FIDs and LUNs associated with the adapter. More preferably, if the FID needs to be recovered, recovering the FID before recovering the LUNs associated with the FID. Most preferably, the LUNs are recovered only if the FID and the adapter associated with the LUNs are not in need of recovery.

Still more specifically, the computer network detects if an adapter is in an unrecoverable state. If the adapter is in an unrecoverable state, the network aborts recovery on the adapter and the FIDs and LUNs associated with the adapter. More preferably, the network sets an adapter state to an unrecoverable state if adapter recovery is not successful.

Yet still more specifically, the computer network detects if a FID is in an unrecoverable state. If the FID is in an unrecoverable state, the network aborts recovery on the FID and the LUNs associated with the FID. More preferably, the network sets the FID state to an unrecoverable state if the FID recovery is not successful. Most preferably, the network also sets the LUN state to an unrecoverable state if the LUN recovery is not successful.

In yet still a more specific aspect, if the recovery of an adapter, FID, or LUN is unsuccessful, the network retries the recovery. More preferably, if the recovery has been retried a number of times, the network marks the adapter, FID, or LUN as unrecoverable.

In yet still another aspect, there is disclosed an operating system for use on a computer programmed to administer a plurality of nodes on the network. The operating system is programmed to selectively recover nodes on the network as previously described.

DETAILED DESCRIPTION OF THE INVENTION

In accordance with the invention, there is disclosed a system and method for selectively recovering nodes on a computer network. The network detects an exception condition and recovers only the nodes within the scope of the exception condition. The network issues I/O requests to nodes during recovery that are not within the scope of the exception condition. The system and method is applicable to any computer network, and specifically to any computer network having a hierarchical node structure. More specifically, the system and method is applicable to a non-uniform memory access ("NUMA") architecture. NUMA refers to a method of configuring a cluster of processors such that memory is shared locally, improving performance and the ability of the system to be expanded.

Figure 1:
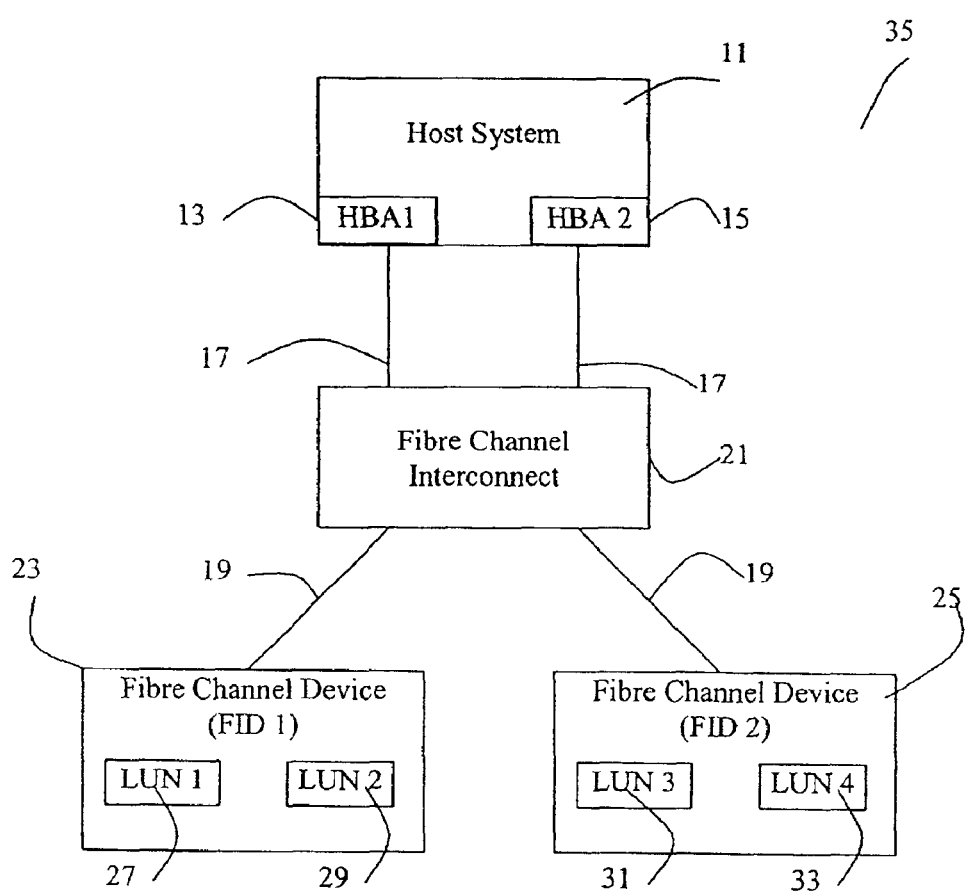
FIG. 1 is an overall schematic block diagram of an example of a hierarchical computer network.

Referring to FIG. 1, an overall schematic block diagram of an exemplary hierarchical computer network is shown. The computer network 35 may be a NUMA system network. A host system 11 is connected to a fibre channel interconnect 21. The host system 11 has one or more processors that run at least one computer program for providing services to other computer programs and processors in the host 11 or in other processors on the network. The host system 11 may be a configuration of processors such as the NUMA architecture. The network 35 may include a plurality of host systems 11. The processors in the host 11 can be one of the processors of a type which is commercially available under the trade names Intel™, AMD™ and Sun Microsystems™, or other like devices. The host 11 is connected by at least one cable 17 to a fibre channel interconnect 21. The fibre channel interconnect 21 is a type of hub or switch. A hub or switch is any device where data arrives from one or more sources and is forwarded out to one or more sources. The fibre channel interconnect 21 includes a "name server," or a list of all nodes in the network.

While FIG. 1 illustrates a fibre channel switched type system, it will be appreciated by those of ordinary skill in the art from a reading of this disclosure that the system and method are not limited to switched fibre channel arrangements. For example, the system and method can be deployed in other configurations such as a fibre channel arbitrated loop (FC-AL) without a switch in which a number of storage devices are connected in a serial loop arrangement to the host system, as well as in Small Computer System Interface ("SCSI"), switch, hub or other environments. However, for ease of description, reference is made to FIG. 1, in a switched fibre channel environment.

The host 11 has at least one adapter 13 and 15 for transmitting I/O requests through the fibre channel interconnect 21 and cable 17 and 19 to at least one fibre channel device 23 and 25. An adapter, or alternatively, a host bus adapter ("HBA"), is a physical device that allows one hardware or electronic interface to be accommodated and transmitted without a loss of functionality to another hardware or electronic interface. As used herein, an adapter is a device that establishes an I/O connection for transferring I/O requests, by adapting and transmitting information that is exchanged between the host 11 and a device 23 and 25. The fibre channel devices 23 and 25, are also referred to interchangeably as Fibre Identification ("FID") 23 and 25. As would be understood by one of ordinary skill in the art, any device that adds capacity to the host 11, such as a disk storage device, any array of disk drives, or similar devices, may be substituted for the fibre channel devices 23 and 25 shown in FIG. 1.

Each fibre channel device 23 and 25 has logical unit numbers ("LUNs") 27, 29, 31 and 33 associated therewith. A LUN is a unique identifier that identifies a specific logical unit. The logical unit may be a user, application, file, or memory location. A LUN signature is associated with each LUN.

It is noted that conventionally, the terms "FID," "LUN" and "LUN signature" have been used by EMC Corporation and others with reference to different types of storage arrays commercially available from EMC Corporation. While the term FID, LUN and LUN signature is used herein for ease of reference and understanding in describing the system and method, it is noted that such terms are not limited to the specific types of storage arrays used by EMC Corporation, and are intended to encompass any such type storage array, providing similar functionality, as used in the industry to provide identification and allow configuring and administration of storage devices in a network, as will be readily apparent to those of ordinary skill in the art.

Figure 2:
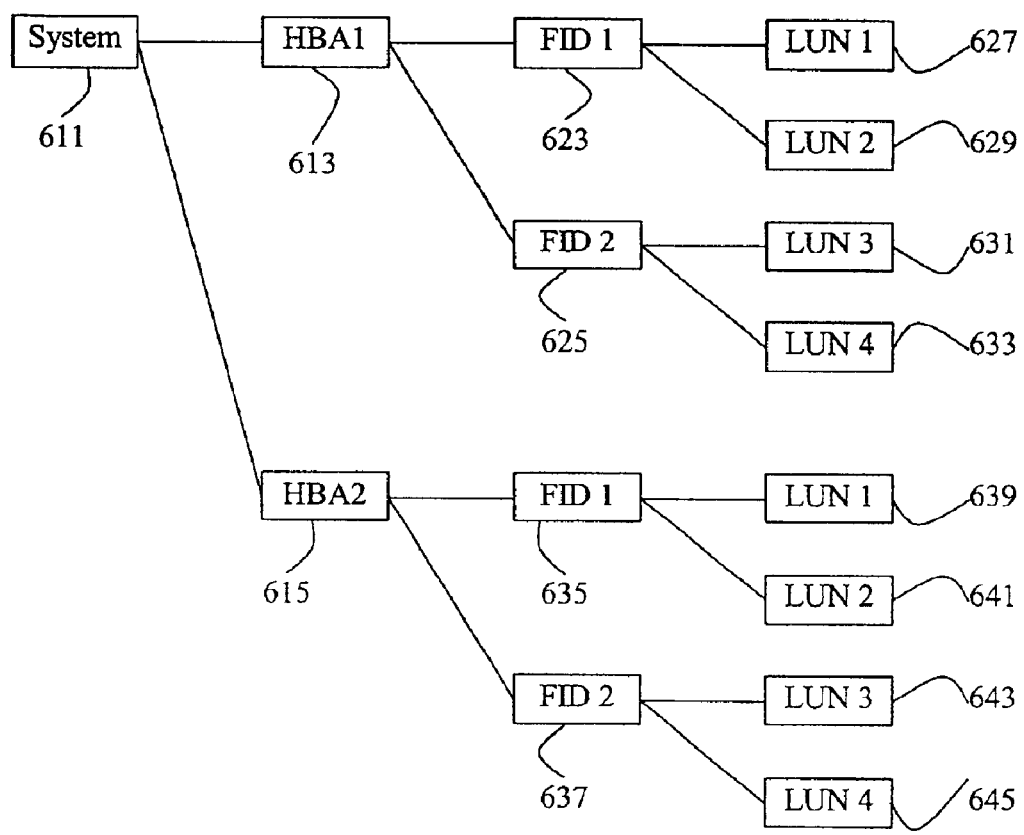
FIG. 2 illustrates the paths through which input/output ("I/O") request travel in a hierarchical computer network.

FIG. 2 illustrates the data structures related to paths through which input/output ("I/O") requests travel in an exemplary hierarchical computer network. The host system data structure 611 contains data about the entire host system 11 (FIG. 1). For example, the HBA data structures 613 and 615 contain data particular to the HBAs 13 and 15 respectively. The FID data structures 623 and 625 contain data particular to fibre channel devices 23 and 25 (FIG. 1) from the point of view of HBA 13. Each adapter data structure 613 and 615 is connected to each FID data structure 623, 625, 635, and 637 and LUNs data structures 627, 629, 631, 633, 639, 641, 643, and 645. Although there may be multiple data structures which refer to the same physical device, they are designated as separate data structures because of the path through which data travels to each corresponding devices. Thus, the host 11 from FIG. 1 can exchange I/O to the same LUN through alternative paths corresponding to different data structures. For example, the host 11 can exchange I/O requests with LUN 27 through adapter 13 and FID 23 from FIG. 1, represented in FIG. 2 by data structures 611, 613, 623 and 627.

FIGS. 3–13 illustrate the program routines that are run from the operating system on the host system 11. By the terms "program routine," "routine" or "subroutine" is meant any block of code that may be logically grouped together and may or may not use the conventional subroutine interfaces as defined by typical programming languages. As would be understood by one of ordinary skill in the art, a program routine or subroutine is generally understood as a stylistic convention of programming, and thus different routines or subroutines may be written in multiple combinations and accomplish the same function. It is also not material whether a particular program routine or subroutine is integrated directly into the system operating system or run as a separate routine or program from the operating system. Thus, as used herein, a program routine or subroutine encompasses any block of code logically grouped together regardless of whether conventional subroutine interfaces as defined by typical programming languages are used or whether it is integrated into the operating system.

In addition, the program routines represented in FIGS. 3–13 are preferably in continuous and simultaneous operation. In this manner, multiple recovery operations may be occurring simultaneously with respect to multiple nodes in the system. While the recovery operations described below occur, I/O requests are sent continuously to nodes on the system in which recovery operations are not occurring. When an I/O request is issued, the system checks whether any of the recovery operations in FIGS. 3–13 are occurring with respect to the node to which the request is issued. If the node is not affected by recovery operations, the I/O request is issued. If the node is affected by recovery operations, the I/O request is not issued until the recovery operations are completed.

As will be better understood by the following discussion, the program routines issue software commands based on adapter, FID and LUN states or change the state of the adapter, FID or LUN based on the success of the software commands issued. The states of the nodes are determined either by checking the state directly or by a process of elimination.

Figure 3:
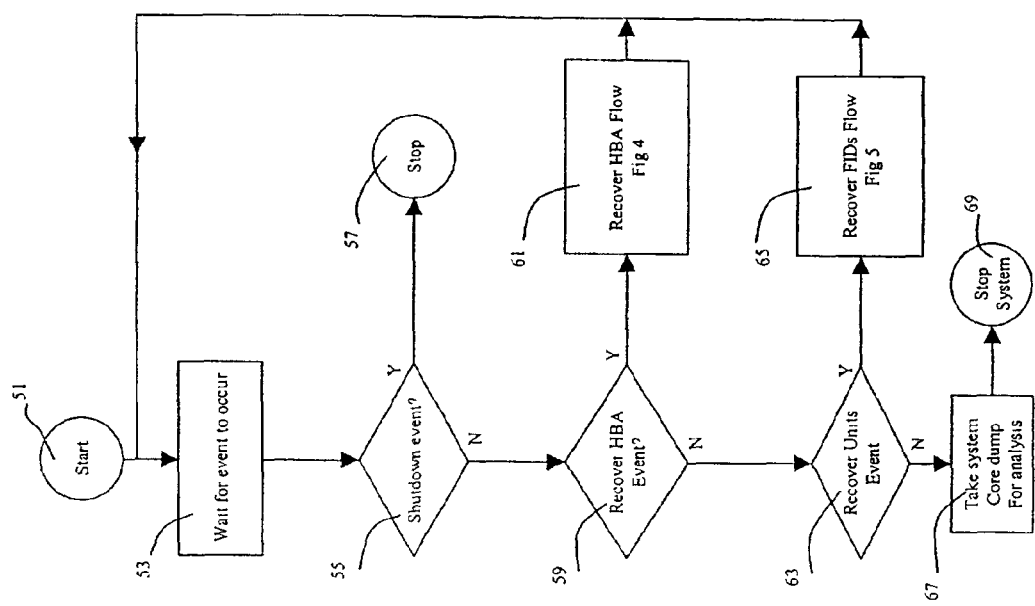
FIG. 3 shows the overall flow of the method described herein.

Referring to FIG. 3, the overall flow of the method as implemented in the exemplary fibre channel switching environment is shown. The operating system on the host system 11 starts the method algorithm at step 51. The operating system waits for an event to occur at step 53. By "event" is meant any message from the network that recovery operations are necessary. An event could be an exception condition or it could be an exception condition triggered by the program routines as described in FIGS. 4–12 and the accompanying discussion.

In the preferred embodiment of the method in the hierarchical structure illustrated by FIGS. 1 and 2, the operating system assigns one of five (5) states to an adapter. The first state is Hba_Dead_Forever, which is an optional state indicating that the adapter is not recoverable even if recovery is requested later by the operating system. The adapter has failed in a way that requires full deconfigureation and re-configuration. The Hba_Dead_Forever state probably requires hardware replacement. Software commands will not recover an adapter in the Hba_Dead_Forever state. The second state is Hba_Dead, which indicates that the adapter is probably not recoverable, but recovery may be requested by the subroutine in certain circumstances. A software repair operation may recover the adapter under certain circumstances. The third state is Hba_Needs_Recovery, which indicates that the adapter is ready for recovery operations. The adapter needs to be reset and identified to the network. The fourth state is Hba_Needs_Login, which indicates that the adapter has been reset, but still needs to be logged into the network. The fifth state is Hba_Ok, which indicates that the adapter is fully working and ready to process I/O requests. FIDs and LUNs associated with the adapter may or may not need recovery.

In the preferred embodiment, the operating system also assigns one of five (5) states to each FID. These state are similar to the adapter states. The first state is Fid_Dead_Forever, which indicates that the FID has failed in a way that requires full deconfiguration and re-configuration. A software operation cannot recover the FID. The second state is Fid_Dead, which indicates that the FID is unusable and cannot process I/O requests. A FID in the second state may be recovered by software commands under certain circumstances. The third state is the Fids_Needs_Flushing state, which indicates that the FID needs "flushing," which means all outstanding I/O requests must be cancelled so that a recovery operation can occur. The fourth state is the Fid_Needs_Login state, which indicates that the FID has had outstanding I/O requests cancelled and needs to be logged into the network environment. The fifth state is the Fid_Ok state, which indicates that the FID is functional and may process I/O requests.

In the preferred embodiment, the operating system assigns one of four states to the LUNs in the network. The LUN states are analogous to the FID and adapter states: Lun_Dead_Forever (the LUN is not functional and cannot be recovered through software commands), Lun_Dead (the LUN is not functional but may be recovered through software commands), Lun_Needs_Recovery (the operating system needs to recover the LUN), and Lun_Ok (the LUN is functional and may process I/O requests).

As would be recognized by one of ordinary skill in the art, the preceding states are examples of a preferred embodiment. The method and system disclosed herein may be implemented using other analogous states or indications of the functionality of nodes on a network. The node states are software constructs that identify to the operating system whether a node is functional on the network. The states may also indicate more specifically what operations must be performed on the node to make the node functional. The states may indicate a progression of events that must occur in order for the node to be recovered. In other words, there may be several progressive states to full node recovery, each with certain software commands that must be issued in order to progress to the next state. If all commands in the progression are successful, the state is set to "Ok," and I/O may be issued to the node.

Figure 4:
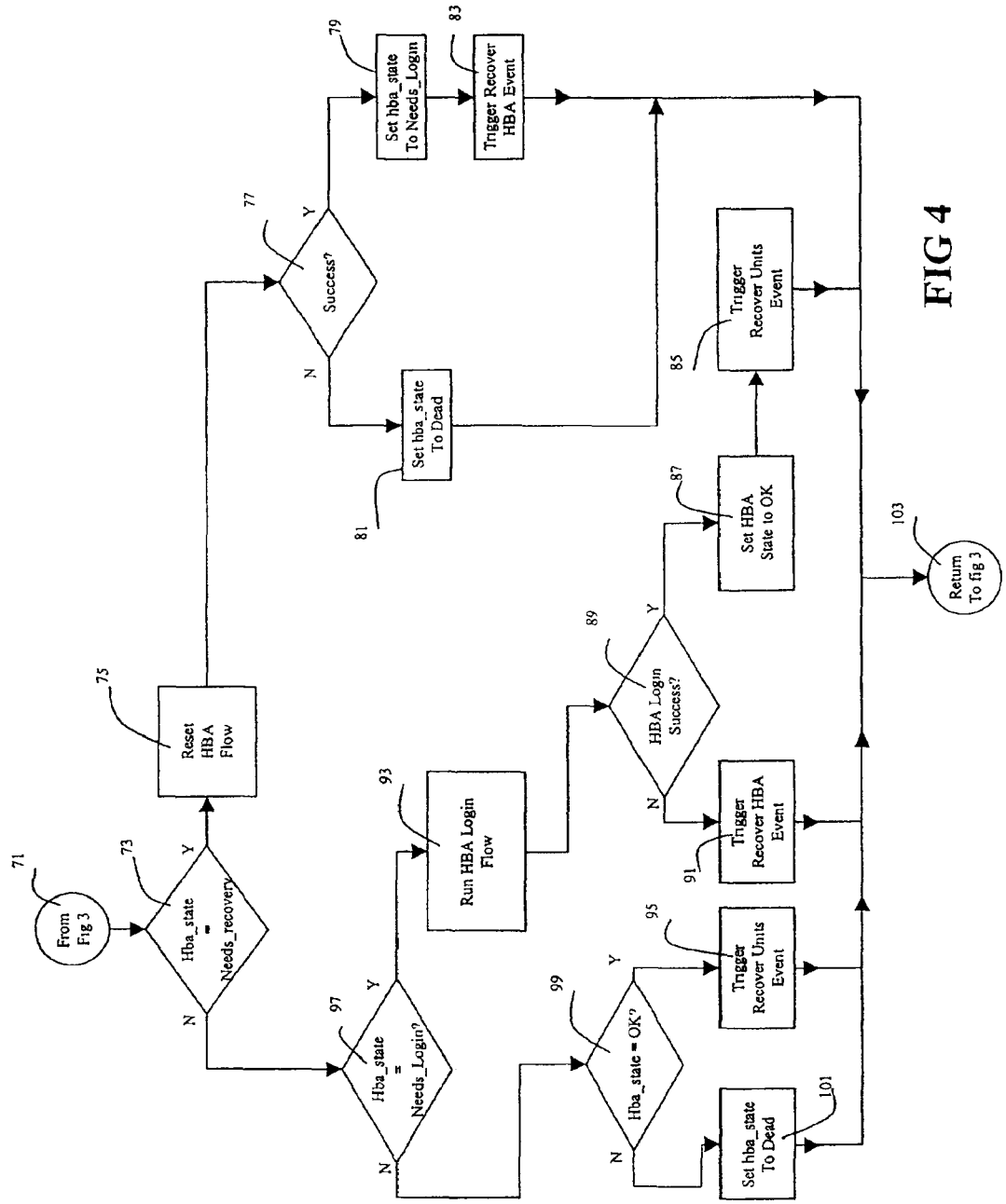
FIG. 4 shows the flow of the method to recover an adapter.
Figure 5:
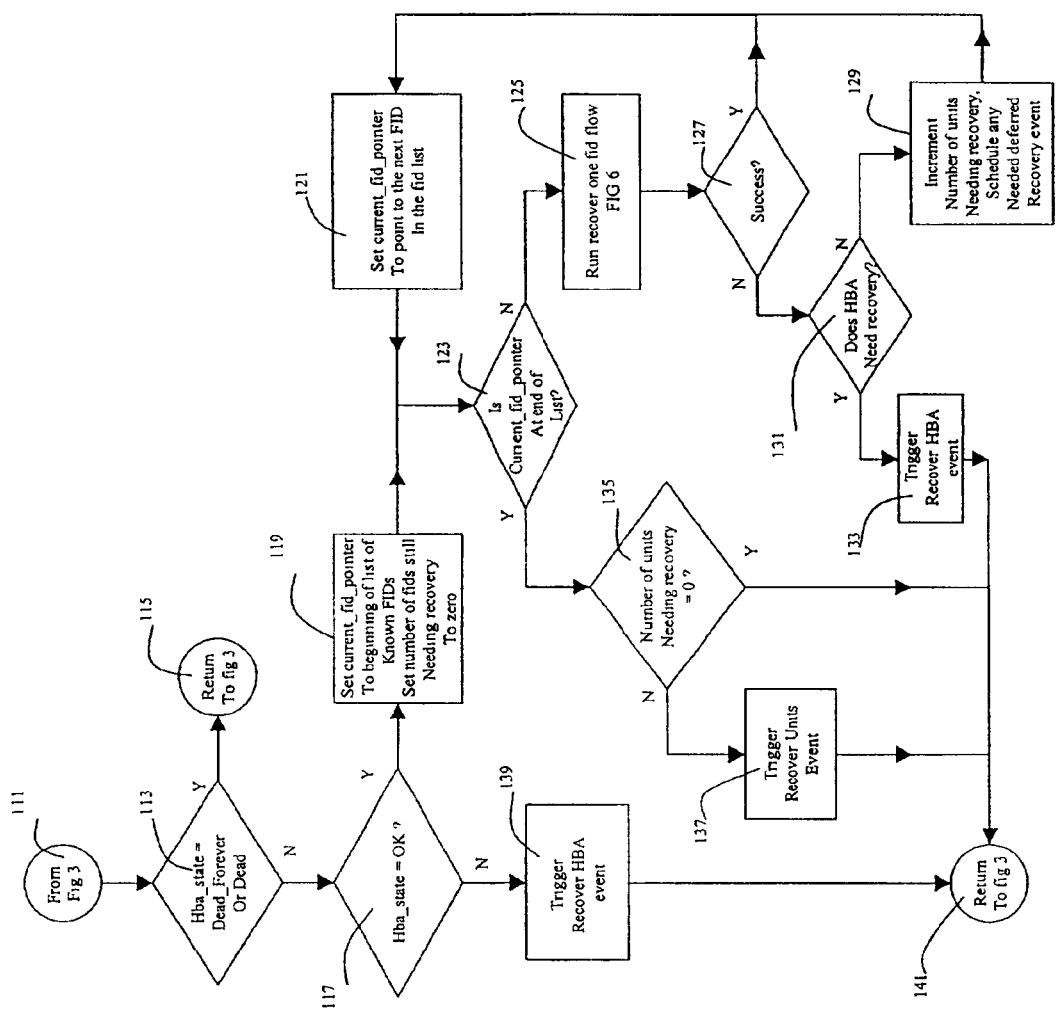
FIG. 5 shows the flow of the method to recover flow through the devices.

There are two general types of events illustrated in FIG. 3: recover Host Bus Adapter ("HBA") events, which indicate that recovery is needed on the adapters, and recover FID or LUN events, which indicate that recovery is needed on the LUNs or FIDs. Recovery of the FID is necessary in order to recover the LUNs associated with the FID. Therefore, both FID events and LUN events trigger the same subroutine to recover the FIDs. However, prior to determining if the event is an HBA event or a FID/LUN event, when the event occurs, it is first determined if it is a shutdown event 55. If yes, then the routine stops 57. If no, if an HBA event occurs at step 59, the operating system runs a program routine to recover the HBA flow at step 61. The program routine to recover HBA flow is illustrated in FIG. 4 and discussed in more detail below. If a recover units event occurs at step 63, the operating system runs a program routine to recover the units at step 65. The program routine for recovering units is shown in FIG. 5 and also discussed in detail below. If an exception event occurs that is not recognizable as a units or HBA event, then the error is not able to be fixed. The program routine then proceeds to step 67 where a "dump" of system information is stored for analysis. The entire system is stopped at step 69. The stored system information may then be analyzed by technicians to determine what error occurred.

FIG. 4 illustrates the program routine to recover HBA events that is triggered at step 61. Step 71 shows the start of the routine from FIG. 3. At step 73, the operating system checks the adapter state. If the adapter state is Hba_Needs_Recovery, the operating system resets the adapter at step 75. The reset is a "hard" reset, which means that the adapter is turned off and then turned on again.

At step 77, the operating system issues a software command that queries whether the adapter reset was successful. If the reset was not successful, the operating system sets the adapter state to Hba_Dead at step 81. The program routine illustrated in FIG. 4 is finished and returns at step 103 to the waiting step 53 in FIG. 3.

If the reset was successful at step 77, the adapter state is changed to Hba_Needs_Login at step 79 to indicate that the adapter needs to be logged into the network. An HBA event is triggered at step 83 and the program routine illustrated in FIG. 4 is finished and returns at step 103 to the waiting step 53 in FIG. 3. Because step 83 triggered an HBA event, step 59 in FIG. 3 will detect an HBA event, and the flow will continue from step 61 in FIG. 3 to step 71 of FIG. 4.

Continuing from step 71 to step 73 in FIG. 4, the operating system queries whether the adapter state is Hba_Needs_Recovery. As indicated above, the adapter state was set at step 79 to Needs_Login. Therefore, the adapter continues to step 97 and queries whether the state is Hba_Need_Login. If the state is Hba_Needs_Login, the operating system runs a series of commands to restore the login flow of the adapter at step 93. The commands to restore the login flow may be standard recovery operation commands, for example, the commands defined by the ANSI Fibre Channel Specifications.

The operating system queries at step 89 whether establishing the login of the adapter was a success at step 89. If the adapter login was successful, the adapter state is set to Hba_Ok at step 87. A recover units event is triggered at step 85, and the program routine is returned at step 103 to the waiting step 53 in FIG. 3.

If the adapter login was not successful at step 89, an HBA event is triggered at step 91, and the program routine is returned at step 103 to the waiting step 53 in FIG. 3.

Turning back to step 97 in FIG. 4, if the adapter state is not Hba_Needs_Login, the operating system queries whether the adapter state is Hba_Ok at step 99. If the adapter state is Hba_Ok, a units event is triggered at step 95, and the program routine is returned at step 103 to the waiting step 53 in FIG. 3.

If the adapter state is not Hba_Ok at step 99, the adapter state is changed to Hba_Dead at step 101. The program routine is returned at step 103 to the waiting step 53 in FIG. 3.

If a recover units event has been triggered, for example, at steps 95, 85, or 83 in FIG. 4, the operating system will detect the units event at step 63 in FIG. 3. The operating system will then run the recover FIDs routine in step 65. The recover FIDs routine is illustrated in FIG. 5.

Step 111 illustrates the start of the recover FIDs routine. At step 113, the operating system queries whether the adapter state is Hba_Dead or Hba_Dead_Forever. If the adapter state is either Hba_Dead or Hba_Dead_Forever, then the adapter cannot be recovered. If the adapter cannot be recovered, recovery of the FIDs associated with the adapter is not possible. Therefore, the flow returns at step 115 to the waiting step 53 in FIG. 3.

In keeping with the hierarchical structure of the computer network, the adapters must be recovered before the FIDs and LUNs are recovered. If the adapter state is not Hba_Ok at step 117, then an HBA event is triggered at step 139, and the flow is returned at step 141 to the waiting step 53 in FIG. 3. If the adapter state is Hba_Ok at step 117, then the operating system begins to recover the FIDs at step 119.

As would be understood by one of ordinary skill in the art, the FIDs are organized in a list of known FIDs in the operating system. A program routine keeps a variable that is equal to the number of FIDs still needing recovery. At step 119, the variable of FIDs needing recovery is initialized to zero. A pointer is set to the beginning of the list of known FIDs.

Figure 6:
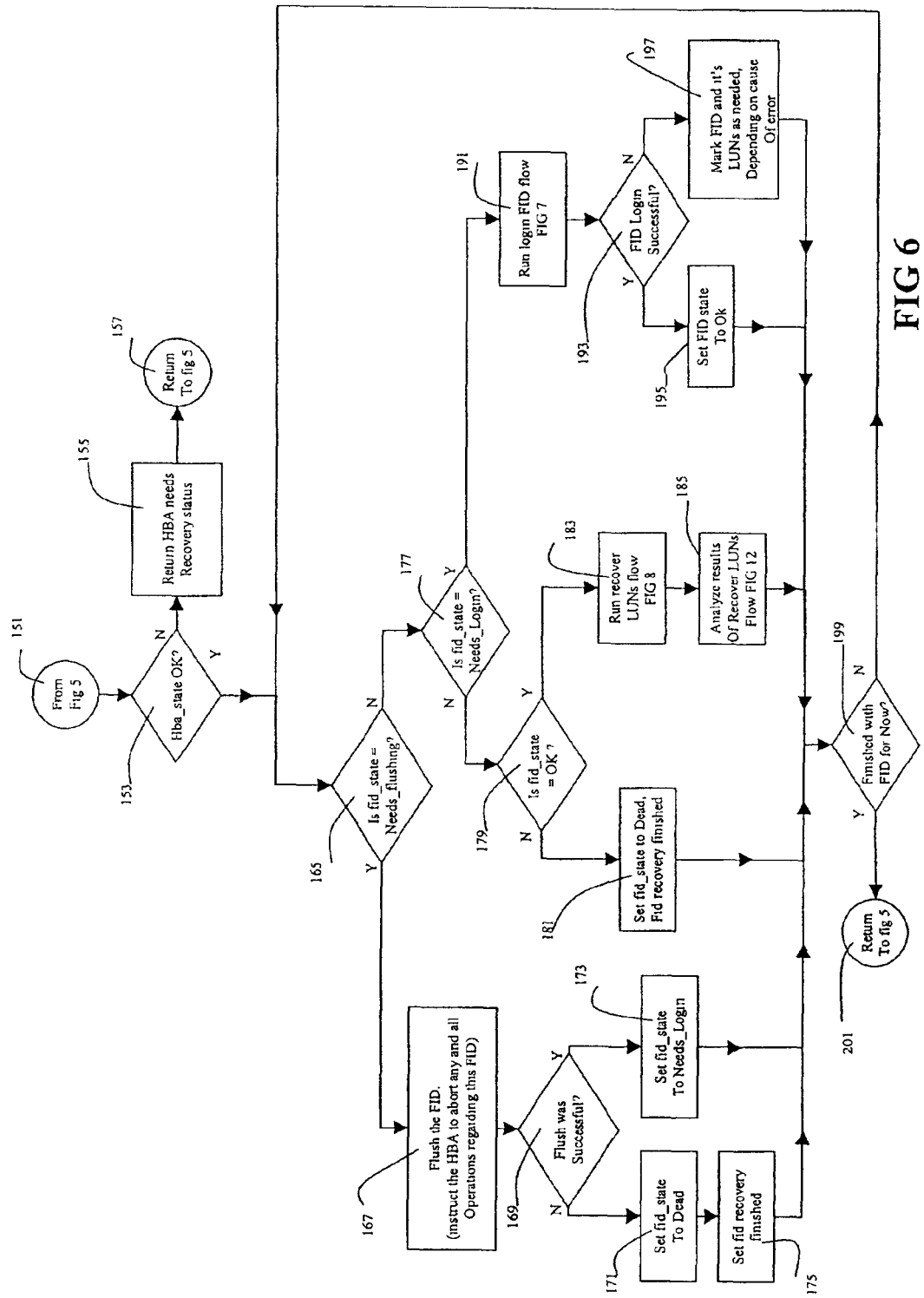
FIG. 6 shows the flow of the method to recover flow through one device.

At step 123, the program routine queries whether the current pointer is set at the end of the list. If the pointer is not at the end of the list, a program routine to recover the FID flow of one FID is run from the operating system at step 125. The program routine at step 125 is illustrated in FIG. 6 and discussed in greater detail below.

Referring back to FIG. 5, if the FID flow has been successfully recovered at step 125 (with details shown in FIG. 6), the program routine determines at step 127 that the FID flow has been successfully recovered and continues to step 121 to set the pointer to the next FID on the list.

If recovering one FID flow was unsuccessful at step 125 (FIG. 6), the program routine determines at step 127 that the FID flow recovery was not successful. At step 131, the program routine queries whether the adapter needs recovery. If the adapter needs recovery at step 131, an HBA event is triggered at step 133 and the program returns to the waiting step 53 in FIG. 3. If the adapter does not need recovery at step 131, the variable that keeps track of the number of LUNs needing recovery is incremented by one at step 129, and the pointer is set to the next FID on the list at step 121.

Once the program routine determines at step 123 that the pointer is at the end of the list, the program queries whether the number of LUNs needing recovery is zero at step 135. If no LUNs need recovery, the program routine is returned at step 141 to the waiting step 53 in FIG. 3. If there are LUNs that need recovery, a units event is triggered at step 137 before the program routine is returned at step 141 to the waiting step 53 in FIG. 3.

Referring now to FIG. 6, and noting that the program routine illustrated in FIG. 6 is triggered at step 125 in FIG. 5, a routine to recover one FID is shown. The routine begins at step 151 from step 125 in FIG. 5. The program routine queries at step 153 whether the adapter state is Hba_Ok. If the adapter state is not Hba_Ok, the adapter state is set to Hba_Needs_Recovery at step 155. At step 157, the program routine returns to FIG. 5 at step 127 with an indication that the recovery of the FID was not successful. By returning a "not successful" status to step 125, the program routine detects the unsuccessful status at step 127. The Hba_Needs-Recovery status is detected at step 131, and an HBA Event is triggered at step 133.

If the HBA state is not "Ok" at step 153, then the program queries whether the FID state is Fid_Needs_Flushing at step 165. If the FID needs flushing, the adapter is instructed at step 167 to abort all I/O requests regarding the FID.

If the flush was successful at step 169, the FID state is set to Fid_Needs_Login at step 173. The routine is not finished with the FID at step 199, and the routine continues at step 159. If the flush was not successful at step 169, the FID state is set to Fid_Dead at step 171, and the FID recovery is set to finished. The routine is finished with the FID at step 199, and returns to FIG. 3, at step 125 from step 201.

Returning to step 165, if the FID does not need flushing, the program routine queries whether the FID state is Fid_Needs_Login at step 177. If the FID needs a login operation run, software commands to login the FID are issued by the routine at step 191. These software commands may be standard login commands specified by the American National Standards Institute ("ANSI") to login a FID.

Figure 7:
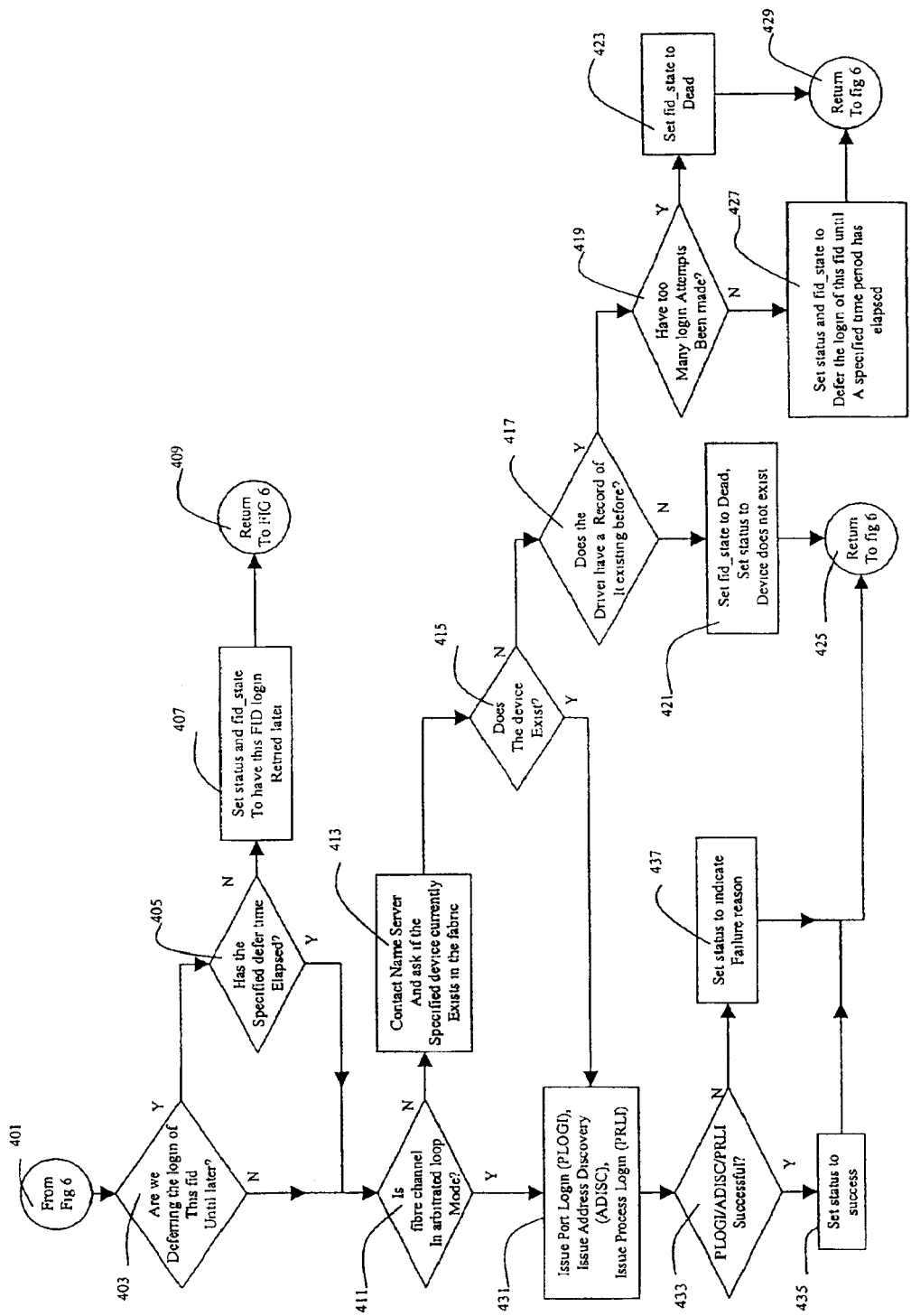
FIG. 7 shows the flow of the method to recover the login of a device.

As would be understood by one of ordinary skill in the art, sometimes a FID is not able to be revalidated by the standard ANSI login commands immediately, but may be recovered at a later time. For example, the FID may not be able to process the number of I/O requests that have issued. At a later time, the "queue" of I/O requests may be eliminated and the FID is capable of processing additional I/O requests. As previously discussed, the program routine depicted in FIG. 5 will retry LUN recovery by triggering a "units event" at step 137, which is detected at step 63 and 65 in FIG. 3 to run the program routine depicted in FIG. 5 again. However, if a "units event" is triggered repeatedly at step 137 before enough time has passed for the FID to be ready for recovery, the program routine is inefficient. It is therefore advantageous to wait an amount of time and then retry the login commands at step 191 in FIG. 6. The algorithm, or program routine, for retrying the login commands at step 191 is depicted in FIG. 7, and described in more detail below. As will be better understood by the following discussion of FIG. 7, the program routine run at step 191 returns a successful status or an error message indicating why the login was not successful.

If the FID login was not successful at step 193, the FID is marked at step 197 according to the cause of error. The possible causes of error are discussed in more detail in the discussion accompanying FIG. 7. If the login was successful, the FID state is set to Fid_Ok at step 195, the routine is now finished with the FID at step 199, and continues to step 201.

Figure 8:
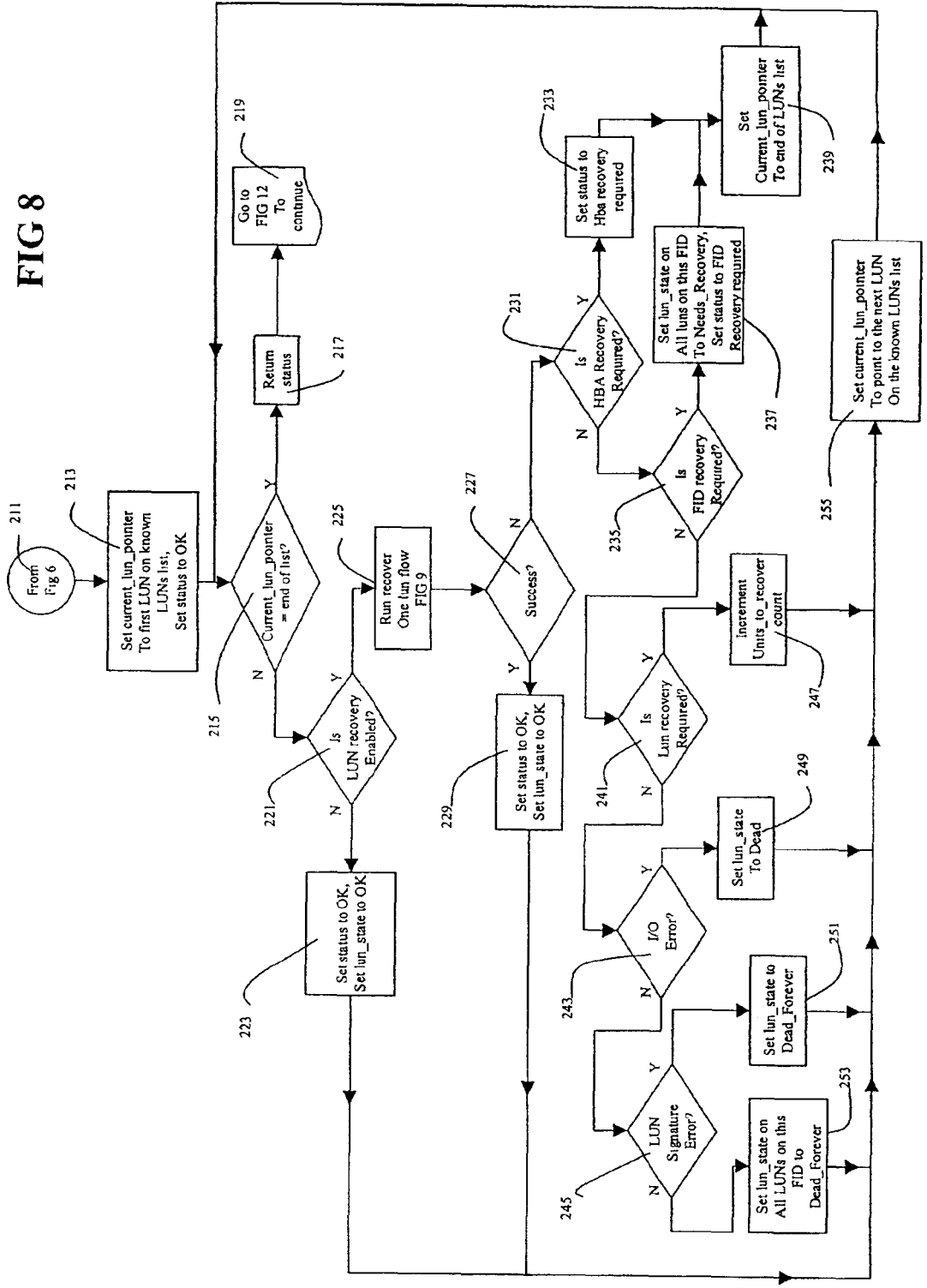
FIG. 8 shows the flow of the method to recover the logical units (LUNs) on a device.

If the FID does not need to be logged in at step 177, the routine queries if the FID state is Fid_Ok at step 179. If the FID state is "Ok," a program routine to recover the LUNs flow is run at step 183. This program routine is illustrated in FIG. 8. As will understood from the discussion accompanying FIGS. 8 and 12, the program routine returns a status that the LUN recovery was either successful or unsuccessful, and these results are analyzed at step 185, which runs the program routine illustrated in FIG. 12. If the FID state is not "Ok" at step 179, then the FID state is set to Fid_Dead at step 181. In either case, the routine is finished with the FID at step 199 and thus, at 201 returns to step 125 in FIG. 5.

FIG. 7 depicts the flow of the program routine that retries the FID login commands at step 191 in FIG. 6. This optional program routine starts at step 401 from FIG. 6 (step 191). At step 403, the routine queries whether the FID has had a deferred login time set. Because any deferred login is set later in the routine, specifically at step 427, at the first iteration of the routine in FIG. 7, the response at step 403 is "no." At step 411, the program routine queries whether the fibre channel is in the arbitrated loop mode. The login commands for the arbitrated loop mode are more simple than in the switching environment. Therefore, the fibre channel is in the arbitrated loop mode, standard commands are issued at step 431 to issue port login, issue address discovery, and issue the process login. These commands are standard ANSI commands. If the commands are successful at step 433, the status is set to "success" at step 435, and the success status is returned to FIG. 6 (step 191) at step 425. If the login commands are not successful at step 433, the status is set to indicate which command failed and the reason for the failure at step 437. This information is also returned at step 425 to FIG. 6 (step 191).

If the fibre channel is not in a loop mode at step 411, several additional steps are necessary. At step 413, the name server is contacted to determine if the FID device is specified in the name server as an existing device. As discussed previously, the name server contains a list of all devices and other nodes in the system. If the FID device exists in the name server at step 415, the program routine can issue the commands at step 431 and proceed through steps 433, 435, 437 and 425 as described above.

If the device does not exist in the name server at step 415, the program queries the device driver whether there has been a previous record of the FID device existing at a prior time at step 417. As would be understood by one of ordinary skill in the art, the device driver keeps a record of all FIDs in the network at times in the past. If there are no records of the FID at step 417, the FID state is set to Fid_Dead at step 421, and this information is returned to FIG. 6 (step 191) at step 425.

If the driver has a record of the FID existing previously, the program routine queries how many login attempts have been made at step 419. If there have been too many login attempts made at step 419, the FID state is set to Fid_Dead at step 423, and the state information is returned at step 429 to FIG. 6 (step 191). By "too many login attempts" is meant a number of attempts indicating that future recovery is unlikely. The number of attempts may be determined experimentally in a particular system, but is preferably about five attempts that occur between two and four seconds apart.

If too many login attempts have been made at step 419, the FID state is set to defer the FID login until a specified period of time has elapsed at step 427. The specified period of time is preferably between 0.5 and 2 seconds. Most preferably, the specified period of time is approximately one second, which has been determined by empirical measurements. The program routine is returned at step 429 to FIG. 6 (step 191). If the FID state is set to defer the login at step 427, a "units event" will be triggered when the specified period of time has expired. As described previously in the discussion accompanying FIG. 1, a units event at step 63 in FIG. 3, and the program routine depicted in FIG. 5 will be run at step 65. The program routines depicted in FIGS. 3–11 may run simultaneously, and thus, other recovery processes may be occurring while during the specified period of time during which the FID state is set to defer the login.

In addition to triggering a "units event" after a specified period of time, setting the FID status to defer the login of the FID at step 427 also triggers a "yes" response at step 403 to the query of whether login is being deferred. If login is being deferred at step 403, and the specified time has not elapsed at step 405, the program routine sets the FID state to have the FID login commands retried later, that is, to trigger a "units event" after a specified period of time, at step 407. The specified period of time at step 407 is the shortest amount of time at which one of the FIDs will trigger a "units event." An unsuccessful recovery status is returned at step 409 to FIG. 6, step 191. If the specified defer time has elapsed at step 405, the program routine flow continues at step 411 as previously described.

Referring to FIG. 8 and noting that the routine depicted in FIG. 8 is run at step 183 in FIG. 6, the program routine starts at step 211. At step 213, a pointer is set to the first LUN on the list of LUNs that is kept in the internal tables of the HBA software. As would be understood by one of ordinary skill in the art, each adapter executes software that keeps a list of nodes with which the adapter chooses to communicate. The routine queries at step 215 if the pointer is at the end of the list. If the pointer is not at the end of the list, the routine queries at step 221 if LUN recovery is enabled. By "enabled" is meant that all data structures, for example, identifying codes, associated with the LUN are complete and I/O requests may be issued. If LUN recovery is not enabled, the status is set to Lun_Ok at step 223. Step 223 allows the program routine to bypass the recovery process by setting the status to Lun_Ok. As would be understood by one of ordinary skill in the art, there are typically other mechanisms in the network for recovering LUN. Therefore, if the LUN still is not able to process I/O at step 223, the status is set to Lun_Ok to bypass the recovery operations described herein. Other mechanism in the network may recover the LUN if it is still not able to process I/O. The program routine sets the pointer to the next LUN on the list at step 255 and returns to step 215.

If LUN recovery is enabled, the program routine runs another program routine at step 225 to recover the flow of one LUN. The program routine that is run at step 225 is shown in more detail in FIG. 9. As will become apparent from the discussion accompanying FIG. 9, the routine run at step 225 returns one of four statuses: Hba$^{Recovery}$_Required, Fid_Recovery_Required, I/O error, or Ok (success).

At step 227, the routine queries whether the return state is Ok or success. If the routine to recover the LUN was successful, the status of the LUN is set to Lun_Ok at step 229. At step 255, the pointer is advance to the next LUN on the list, and the program routine returns to step 215.

If the status returned is not "success," the routine queries if the status is Hba_Recovery_Required at step 231. If adapter recovery is required, step 233 sets the status to Hba_Recovery_Required. If adapter recovery is not required, the routine queries at step 235 if FID recovery is required. If FID recovery is required, the program routine sets the LUN state on all LUNs residing on the FID to Lun_Needs_Recovery, and the status of the FID to Fid_Needs_Recovery at step 237. If either FID recovery or adapter recovery is required at steps 237 or 233, the LUN pointer is set to the end of the LUN list, and the program routine is set at step 215 to query if the pointer is at the end of the list. A status that indicates the type of problem is returned at step 217, and the program routine proceeds to step 219 and then to step 450 of FIG. 12. As will be understood from the discussion accompanying FIG. 12, the program routine returns status and flags to step 199 in FIG. 6 that will control the steps taken in FIG. 6.

If FID recovery is not required at step 235, the routine queries whether LUN recovery is required at step 241. If LUN recovery is required, the number of units, or LUNs, to recover is incremented by one at step 247. If LUN recovery is not required at step 241, the program routine queries whether there has been an I/O error at step 243. If there is an I/O error, the LUN state is set to Lun_Dead at step 249. If there is no I/O error, the program routine checks whether there has been a LUN signature error at step 245. If there is a LUN signature error, the LUN state is set to Lun_Dead_Forever at step 251. If there is no LUN signature error, the LUN state on all LUNs on the FID are set to Fid_Dead_Forever at step 253.

If the program routine has performed steps 247, 249, 251, or 253, the LUN pointer is set to the next LUN on the list at step 255, and the routine is set to step 215.

Figure 12:
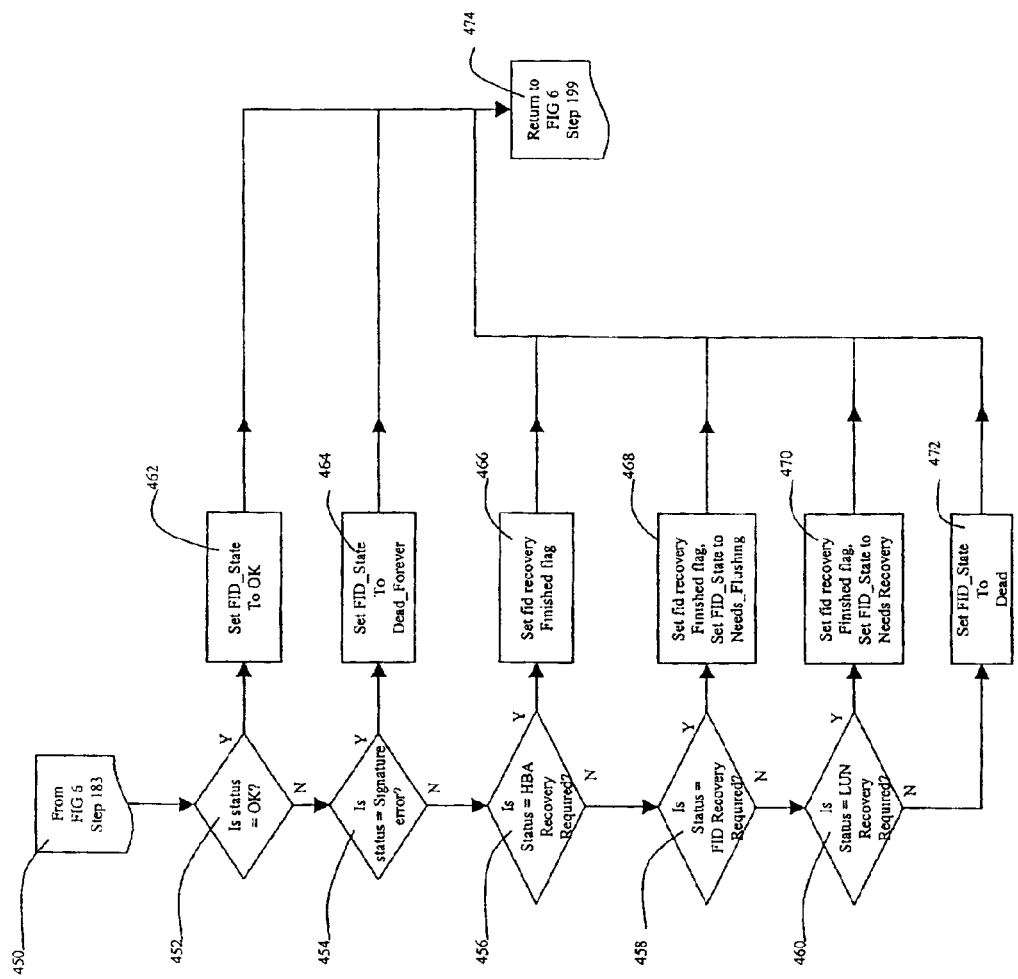
FIG. 12 shows the flow of analyzing state results to recover LUNs.

Referring now to FIG. 12, at step 450, the program routine receives the status and flags that were set in step 219 of FIG. 8, which determines the steps performed in FIG. 12. In step 452, if the status was set to "Ok," indicating that the LUNs were successfully recovered, the program routine proceeds to step 462 where the FID state is set to Fid_Ok to indicate that the FID is available for any and all I/O requests. If the status is not "Ok," the program routine proceeds to step 454 where the status is checked to determine if a signature error occurred. If a signature error occurred, then the data on the FID and its associated LUNs cannot be validated. To prevent corruption, the program routine proceeds to step 464, where the FID state is set to Fid_Dead_Forever to prevent any attempts at future recovery.

If no signature error was detected at step 454, the program routine proceeds to step 456 and tests the status to determine if the HBA requires recovery. If so, the program routine proceeds to step 466 where a flag is set to signal that the FID recover is finished. This flag will cause subsequent program routines to initiate HBA recovery.

If HBA recovery was not needed at step 456, the program routine proceeds to step 458 where the program routine checks for a status of FID recovery required, indicating that the entire FID needs to be recovered again. If the FID needs to be recovered, the program routine proceeds to step 468 where the status and flags are set to restart FID recovery.

If step 458 did not determine that FID recovery was needed, then the program routine proceeds to step 460, which detects if the status indicates that one or more of the LUNS on the FID still need recovery (Lun_Recovery_Required). If so, the program routine will proceed to step 470 and set the flags and the FID state to indicate that fibre recovery steps need to be re applied on the FID and its associated LUNs.

If steps 452, 454, 456, 458, or 460 did not detect one of the expected status conditions, then an unexpected condition occurred. The program routine sets the FID state to Fid__Dead.

After either steps 462, 464, 466, 468, 470, or 472, the program routine is returned to FIG. 6, step 199.

Figure 9:
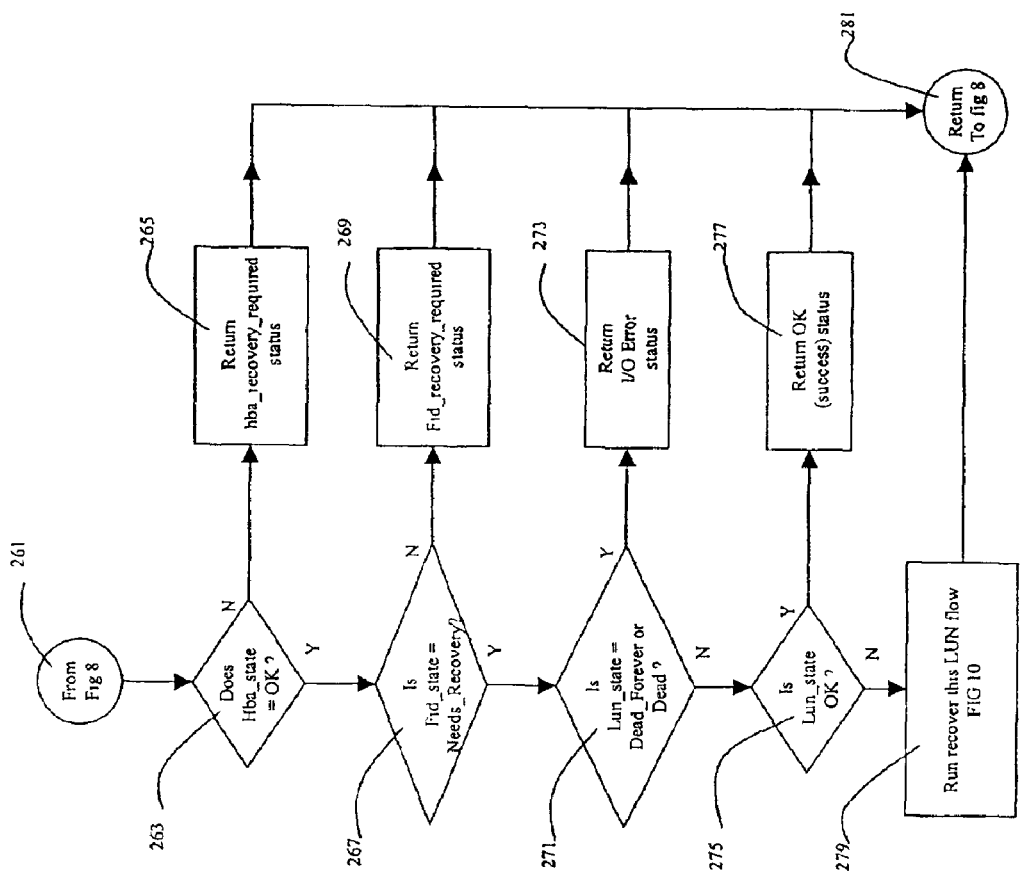
FIG. 9 shows the flow of the method to recover one unit on a device.

The program routine to recover one LUN flow that is run at step 225 is illustrated in detail at FIG. 9. The routine starts at step 261 and queries at step 263 if the adapter state is Hba__Ok. If the adapter state is not Hba__Ok, the return status is set to Hba__Recovery__Required at step 265. Next, if the FID state is not Fid__Needs__Recovery at step 267, the return status is Fid__Recovery__Required. If the LUN status is Lun__Dead__Forever or Lun__Dead at ste[271, then an I/O error status is returned at step 273. If the LUN state is Lun__Ok at step 275, the Ok, or "success" status is returned at step 277. If the status has been set at steps 265, 269, 273, or 277, the status is returned at step 281, and the program routine continues from FIG. 8 step 225.

If the LUN state is not Lun__Ok at step 275, a program routine to recover the LUN is run from step 279. This program routine is discussed in greater detail in FIGS. 10 and 11. As will become apparent from the following discussion of FIGS. 10 and 11, the program routine run at step 279 issues a series of commands to recover the LUN and returns either an "Ok" or "successful" status, or it returns a "recovery failure" status. This status is also returned at step 281 in FIG. 9 to step 225 in FIG. 8.

Figure 10:
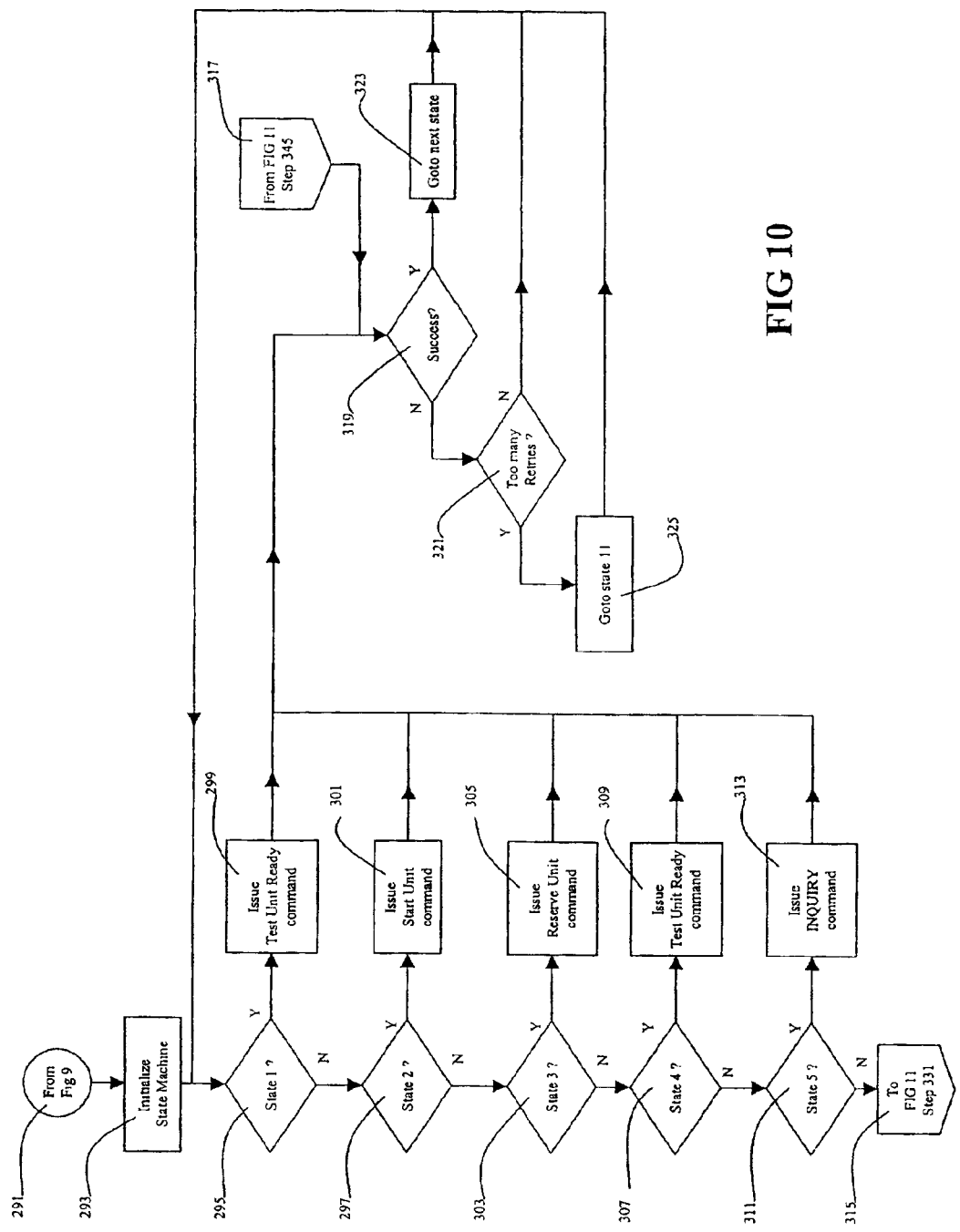
FIG. 10 shows a continuation of the flow of the method to recover one unit on a device.
Figure 11:
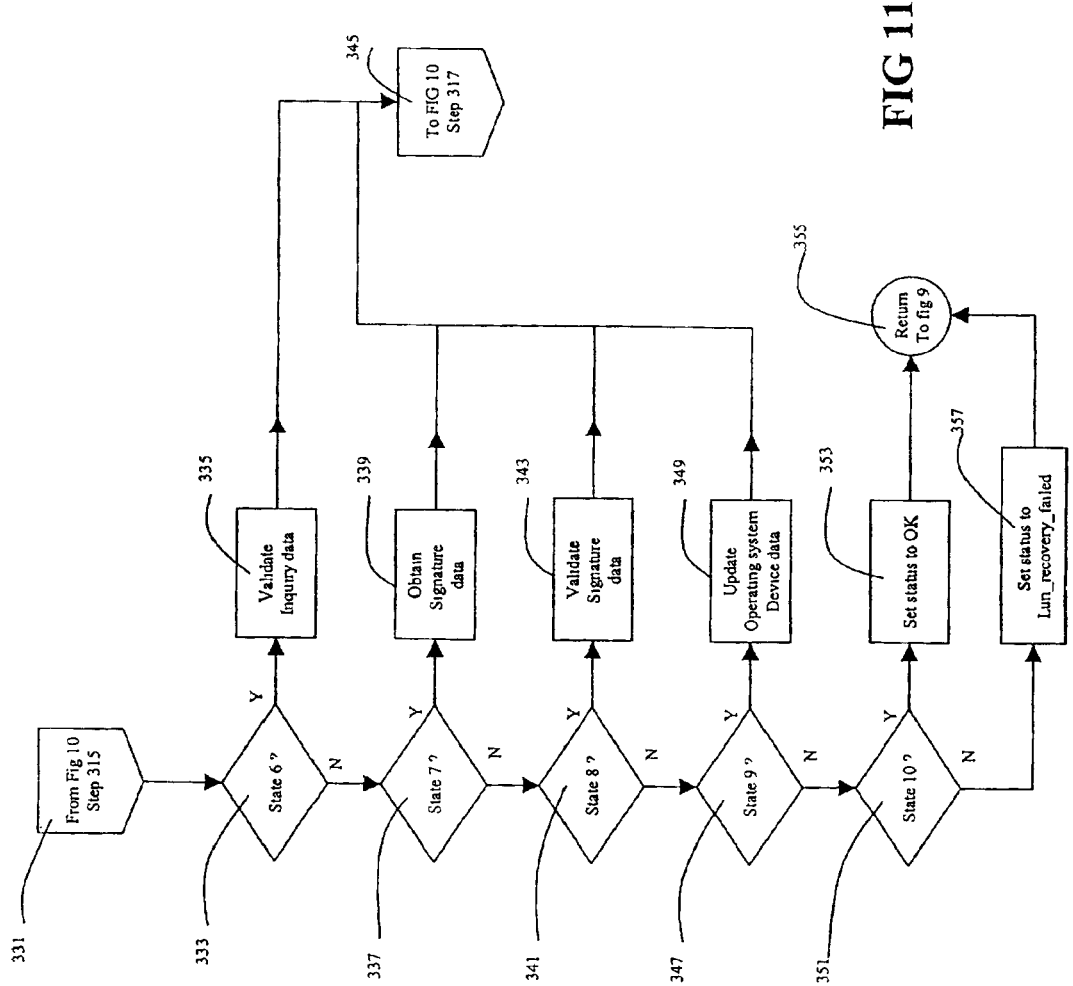
FIG. 11 shows a second continuation of the flow of the method to recover one unit on a device.

Referring now to FIG. 10, the routine starts at step 291, a state machine is initialized at step 293. As would be understood by one of ordinary skill in the art, a state machine is an algorithm that has a set of input events, output events, and states with functions for mapping states and input to output and a function that maps states and inputs to states, which is commonly referred to as a state transition function. The state machine initialized at step 293 is illustrated in FIGS. 10 and 11. There are eleven states represented in FIGS. 10 and 11 by the numbers 1–11. As will be better understood by the following discussion, if the state machine is at a given state, a particular command is issued. The state is initialized to state 1, and if the command is successful, the state machine is set to the next state. Thus, the state machine runs all command consecutively. If the command is not successful, the command is retried. After a certain number of retries, the state is set to state 11, which triggers a recovery failure marker. As would be understood by one of ordinary skill in the art, the commands issued are standard recovery commands used to recover a LUN.

If the state at step 295 is state 1, a command to test whether the unit is ready is issued at step 299. If the state is at "2," the program routine issues a command to start the unit in step 301. At state "3" at step 303, a command to recover the units is issued at step 305. At step 307, if the state is "4," a command H to test units read is issued. At step 311 (state "5") the "INQUIRY" command is issued. "INQUIRY" is an ANSI specified command that instructs the FID to return various identification information to the host system. The flow of FIG. 10 is continued from step 315 to step 331 of FIG. 11.

At state 6 in step 333, a command to validate the inquiry data is issued at step 335. At state 7 in step 337, a command to obtain signature data is issued at step 339. If the state is state 8 at step 341, a command is issued to validate signature data at step 343. Next, at step 347, if the state is state 9, a command to update the operating system device data is issued at step 349. The operating system device data is data kept by the operating system regarding the node locations and addresses in the network. If the state has reached state 10 at step 351, then recovery has been successful because all steps are completed, and the status is set to Lun__Ok at step 353. If the state has gone through steps 295, 297, 303, 307, 311, 333, 337, 341, 347, and 351 with all "no" responses, then the status is set to Lun__Recovery__Failed at step 357. Either the Lun__Ok or Lun__Recovery__Failed status is returned at step 355 to FIG. 9, step 279.

Referring again to FIGS. 10 and 11, after commands are issued at steps 299, 301, 305, 309, 313, 335, 339, 343, and 349, the state machine is returned to step 319. The flow from steps 335, 339, 343, and 349 is depicted in FIG. 11 at step 345 connecting to step 317 in FIG. 10 merely for clarity. If the command is successful at step 319, the state machine progresses to the next state in the sequence at step 323 and returns to step 295. If the issued command is not successful at step 319, the state machine queries if there have been too many retries at step 321. If there are too many retries, the state is set at "11." If there have not been too many retries at step 321, the state machine is returned to step 295 without the state being advanced. Thus, if the command is not successful at step 319, the state stays the same and the command is reissued, or if the command has been retried too many times at step 321, a state "11" is set at 325. The state 11 will result in "no" responses to the queries of steps 295, 297, 303, 307, 311, 333, 337, 341, 347, and 351, and a status of Lun__Recovery__Failed in step 357.

Figure 13:
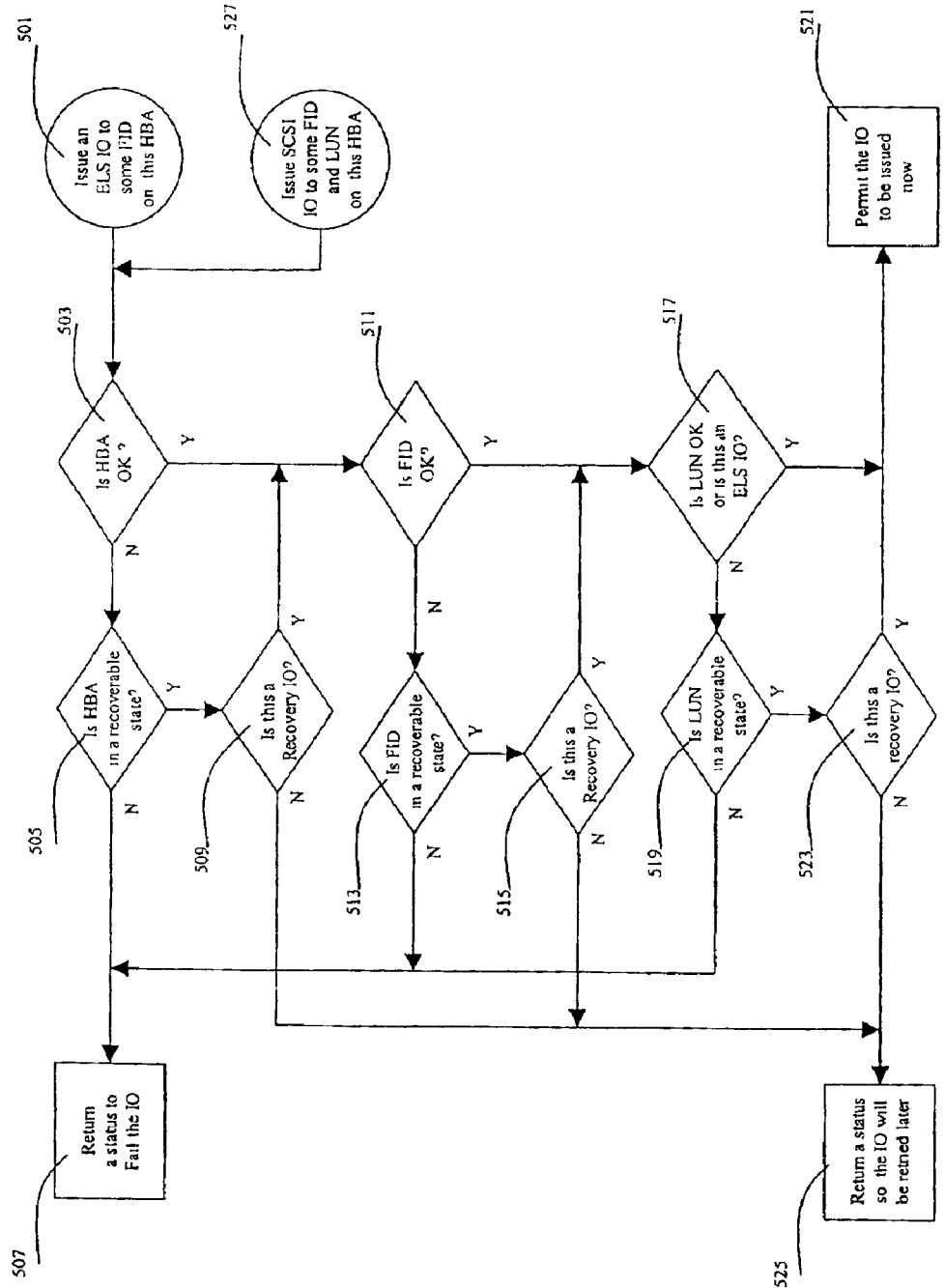
FIG. 13 shows the flow of the method to issue I/O while checking the node status.

Referring now to FIG. 13, the process through which the system issues I/O after checking the recovery status is illustrated. As would be understood by one of ordinary skill in the art, there are generally two types of I/O protocol issued in the system: SCSI I/O and Fibre Channel Extended Link Services ("ELS") I/O. ELS I/O do not utilize the LUN data structure, and therefore identify nodes based on an adapter and FID.

At step 501, and ELS I/O is issued to a particular FID on the HBA, or at step 527, a SCSI I/O is issued to a particular LUN and FID on the HBA. At step 503, the program routine queries whether the adapter state is Hba__Ok. If the adapter is "Ok" at step 503, the program routine queries whether the FID is in the Fid__Ok state at step 155. If the FID is "Ok" at step 511, the program queries at step 517 if the LUN is in the Lun__Ok state. If the LUN is "Ok" at step 517, the I/O may be issued at step 521.

If the HBA, FID, or LUN is not in a recoverable state at steps 509, 515, or 523, respectively, then the I/O is failed at step 507.

At each of steps 505, 513, and 519, the program routine checks to see if the HBA, FID, or LUN, respectively, is in a recoverable state. By "recoverable state" is meant any state other than "Dead__Forever" which indicates that recovery is possible. If the state is recoverable at either steps 505, 513, or 519, the program routine queries whether the I/O request is related to a "recovery I/O." By the term "recovery I/O" is meant that the I/O has been issued in order to recover a node. As would be understood by one of ordinary skill in the art, the recovery commands and other information exchanges described in FIGS. 3–12 involve I/O requests. Such I/O are "recovery I/O." At steps 509, 515, and 523, the program routine has already determined that an HBA, FID, or LUN, respectively, is not in the "Ok" state but is in a recoverable state. Because recovery is necessary on the relevant node before I/O unrelated to recovery are processed, if the program routine determines at steps 509, 515, or 523, that the I/O is not a recovery I/O, the I/O processing is postponed at step 525. Step 525 returns a status that allows the I/O to be retried later.

If the I/O is a recovery I/O at step 509, the program routine proceeds to check the FID state at step 511. Proceeding through steps 513 and 515 to check the FID state as described above, if the I/O is a recovery I/O at step 515, the program routine proceeds to check the LUN state at step 517. If the LUN state in is "Ok" or the I/O is an ELS I/O, then the I/O is issued at step 521. If the LUN is in a recoverable state at step 519, and is a recovery I/O, then the I/O is issued at step 521.

As can be appreciated by FIG. 13, the data structures are verified in a hierarchical order. No I/O requests are processed if a node is not in the "Ok" state, unless the I/O is a recovery I/O. If a node is in the "Dead_Forever" state, the I/O request is failed. If a node is in a recoverable state but not the "Ok" state, it can be assumed that recovery operations as described in FIGS. 3–12 are in process on the particular HBA, FID, and optionally, LUN to which the I/O request has been issued. Therefore, non-recovery related I/O are postponed, while only recovery I/O are issued. The checking mechanism illustrated in FIG. 13 is used for each I/O that is issued on an HBA to a particular FID and optionally, LUN. Therefore, I/O are issued between nodes for which recovery is not required at the same time that recovery operations are being performed on other nodes requiring recovery.

It will be appreciated from the above description that the invention may be implemented in other specific forms without departing from the spirit or essential characteristics thereof. The scope of the invention is indicated by the appended claims rather than by the foregoing description and all changes within the meaning and range of equivalency of the claims are intended to be embraced therein.

What is claimed is:

1. A method of selectively recovering nodes on a computer network having a plurality of paths connected to adapters on at least one host computer for managing input/output (I/O) requests between the host computer and fibre channel devices (FIDs) having a plurality of logical units (LUNs) associated therewith, comprising:

detecting an exception condition in a network, said detection being done with a computer connected to the network, and having an operating system thereon programmed for detecting exception conditions;

recovering only the adapters, FIDs and LUNs within the scope of the exception condition; and issuing I/O requests to adapters, FIDs and LUNs during recovery that are not within the scope of the exception condition.

2. The method of claim 1, further comprising:

detecting if an adapter is in an unrecoverable state; and if the adapter is unrecoverable, aborting recovery on the adapter and the FIDs and LUNs associated with the adapter.

3. The method of claim 2, further comprising:

setting an adapter state to an unrecoverable state if adapter recovery is not successful.

4. The method of claim 1, further comprising:

detecting if a FID is in an unrecoverable state; and if the FID is unrecoverable, aborting recovery on the FID and the LUNs associated with the FID.

5. The method of claim 4, further comprising:

setting the FID state to an unrecoverable state if the FID recovery is not successful.

6. The method of claim 1, further comprising:

setting the LUN state to an unrecoverable state if the LUN recovery is not successful.

7. The method of claim 1, further comprising:

if recovering an adapter, FID, or LUN is unsuccessful, retrying the recovery; and if the recovery has been retried a number of times, marking the adapter, FID, or LUN as unrecoverable.

8. The method of claim 1, wherein the computer network includes a fabric switch.

9. A method of recovering nodes in a hierarchical computer network, comprising:

detecting an exception condition in said network, said detection being done with a computer connected to the network and having an operating system thereon programmed for detecting exception conditions;

recovering only the nodes within the scope of the exception condition; and issuing input/output (I/O) requests to nodes during recovery that are not within the scope of the exception condition.

10. The method of claim 9, wherein the computer network has a hierarchical structure and said recovering is processed sequentially starting from the top of the hierarchy.

11. The method of claim 10, further comprising:

detecting if a node on the network is in an unrecoverable state;

if the node is unrecoverable, aborting recovery on the node and all nodes beneath the unrecoverable node in the hierarchical structure.

12. The method of claim 10, further comprising:

if recovery of a node is unsuccessful, retrying the recovery; and if the recovery has been retried a number of times, marking the node as unrecoverable.

13. The method of claim 10, further comprising, setting the node state to an unrecoverable state if recovery is not successful.

14. A computer system for recovering devices on a computer network, comprising:

at least one computer connected on a fibre channel network;

at least one adapter associated with the computer managing paths on the fibre channel network to multiple devices connected on the network; and an operating system resident on the computer programmed to detect exception conditions relating to adapters, LUNs or devices, to recover only the adapters LUNs or devices within the scope of the exception condition, and to issue input/output (I/O) requests to adapters, LUNs or devices during recovery that are not within the scope of the exception condition.

15. The computer system of claim 14, wherein said operating system is further programmed for recovering adapters, FIDs on LUNs within the scope of the exception conditions by, 1) if an adapter needs to be recovered, recovering the adapter before recovering FIDs or LUNs associated with the adapter, 2) if an FID needs to be recovered, recovering the FID before recovering LUNs associated with the FID, and 3) recovery LUN's only if an FID and adapter associated with the LUN's are not in need of recovery.

16. The computer system of claim 15, wherein said operating system is further programmed for detecting if an adapter, FID or LUN is in an irrecoverable state; and if the adapter, FID or LUN is unrecoverable, for aborting recovery on the adapter and the FID's and LUNs associated with the adapter, and the FID or LUN which is unrecoverable.

17. The computer system of claim 16, wherein said operating system is further programmed for retrying recovery of an adapter, FID or LUN if recovery is unsuccessful; and if the recovery has been retried a number of times, for marking the adaptor, FID or LUN as unrecoverable.

18. A method of selectively recovering nodes on a computer network having a plurality of paths connected to adapters on at least one host computer for managing input/output (I/O) requests between the host computer and fibre channel devices (FIDs) having a plurality of logical units (LUNs) associated therewith, comprising:

detecting an exception condition in a network, said detection being done with a computer connected to the network and having an operating system thereon programmed for detecting exception conditions;

recovering the adapters, FIDs or LUNs within the scope of the exception condition, said recovering being conducted by, 1) if an adapter needs to be recovered, recovering the adapter before recovering FIDs or LUNs associated with the adapter, 2) if an FID needs to be recovered, recovering the FID before recovering LUNs associated with the FID, and 3) recovering LUNs only if an FID and adapter associated with the LUNs are not in need of recovery; and issuing I/O requests to adapters, FIDs and LUNs during recovery that are not within the scope of the exception condition.

19. The method of claim 18, further comprising:

detecting if an adapter is in an unrecoverable state;

if the adapter is unrecoverable, aborting recovery on the adapter and FIDs and LUNs associated with the adapter; and setting the adapter state to an unrecoverable state if the adapter recovery is not successful.

20. The method of claim 18, further comprising:

if recovering an adapter, FID, or LUN is unsuccessful, retrying the recovery; and if the recovery has been retried a number of times, marking the adapter, FID, or LUN as unrecoverable.

* * * * *